United States Patent [19]
Leonard

[11] 3,842,322
[45] Oct. 15, 1974

[54] PLUG-ON DISTRIBUTION PANEL WITH RETAINING MEANS FOR BOTH SMALL AND LARGE CIRCUIT BREAKERS

[75] Inventor: James H. Leonard, St. Louis, Mo.

[73] Assignee: Square D Company, Park Ridge, Ill.

[22] Filed: Oct. 17, 1972

[21] Appl. No.: 298,207

[52] U.S. Cl. .............................................. 317/119
[51] Int. Cl. .................................................. H02b
[58] Field of Search ........................... 317/117–120

[56] References Cited
UNITED STATES PATENTS

| | | | |
|---|---|---|---|
| 26,737 | 12/1969 | Jorgensen | 317/119 |
| 3,202,880 | 8/1965 | Stanback | 317/120 |
| 3,346,777 | 10/1967 | Leonard | 317/119 |
| 3,619,727 | 11/1971 | Hackenbroch | 317/119 |

Primary Examiner—Robert K. Schaefer
Assistant Examiner—Gerald P. Tolin
Attorney, Agent, or Firm—Harold J. Rathbun; William F. Porter, Jr.

[57] ABSTRACT

A plurality of flat, elongated bus bars are flatwise aligned in a stack and spaced to receive plug-on jaws of relatively large circuit breakers. For mounting relatively small circuit breakers not suitable for plugging directly onto the bus bars of the stack, a plug-on mounting device for the relatively small circuit breakers is provided and includes a plurality of terminal attachment buses each having a plug-on jaw member secured thereto and pluggable onto one of the bus bars of the stack. The terminal attachment buses extend perpendicularly to the bus bars of the stack when plugged thereon by their plug-on jaws and the lengthwise dimension of the relatively small circuit breakers, extending from line to load terminals thereof, is perpendicular to the bus bars of the stack when the relatively small circuit breakers are plugged on the terminal attachment buses by their plug-on line terminals.

4 Claims, 4 Drawing Figures

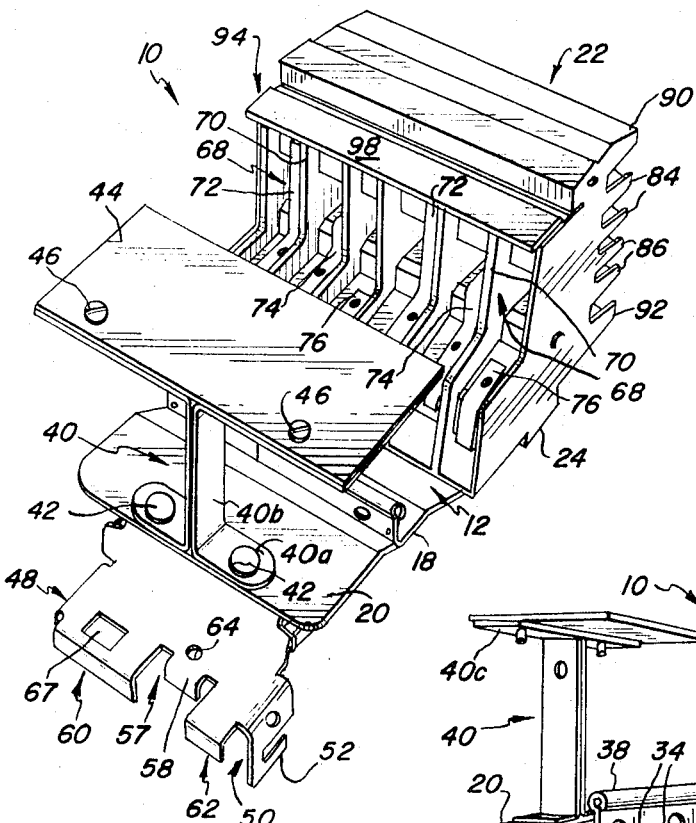
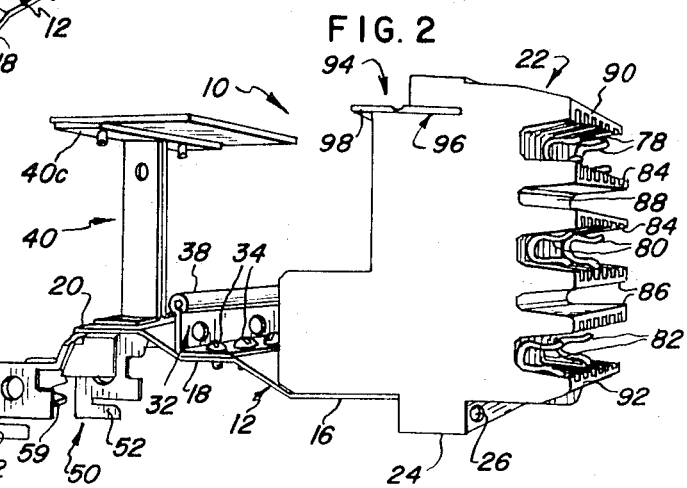
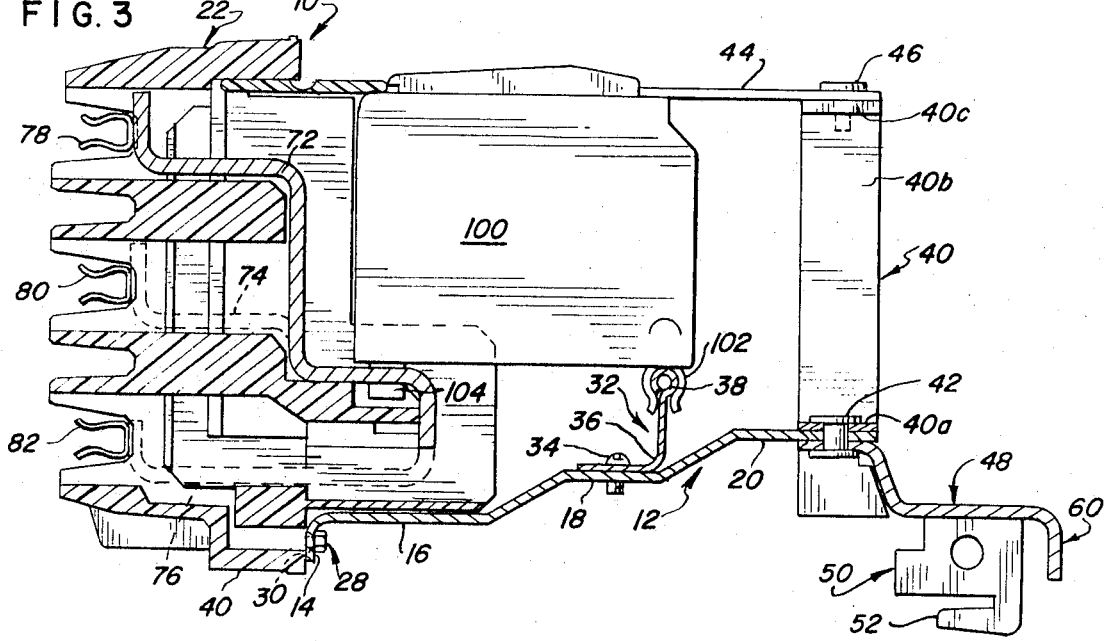

PLUG-ON DISTRIBUTION PANEL WITH RETAINING MEANS FOR BOTH SMALL AND LARGE CIRCUIT BREAKERS

This invention relates generally to electrical having a bus bar stack for relatively large plug-on circuit breakers panelboards. An object of the invention is to provide a plug-on circuit breaker mounting device for relative small plug-on circuit breakers not mountable directly on the bus bars of the stack type.

It is an object of the present invention to provide such an adapter panel for mounting on a panelboard which permits simple, reliable and safe conversion of a switchboard having a main bus with a relatively high current carrying capacity at least partially into a plurality of distribution circuits each having a relatively lower current carrying capacity.

It is another object of the invention to provide such an adapter panel which is substantially an integral unit, which may be selectively installed in or removed from a switchboard, which simply and safely receives and supports a circuit breaker.

Other objects, features and advantages of the present invention will become apparent from the following description of a particular embodiment, taken together with the attached drawings thereof, in which:

FIG. 1 is a perspective view of a plug-on circuit breaker mounting device constructed in accordance with the invention;

FIG. 2 is another perspective view of the mounting device of FIG. 1;

FIG. 3 is a view, partially in side elevation and partially in cross section, of the mounting device of FIG. 1 with a circuit breaker mounted in place thereon.

Figure 4:
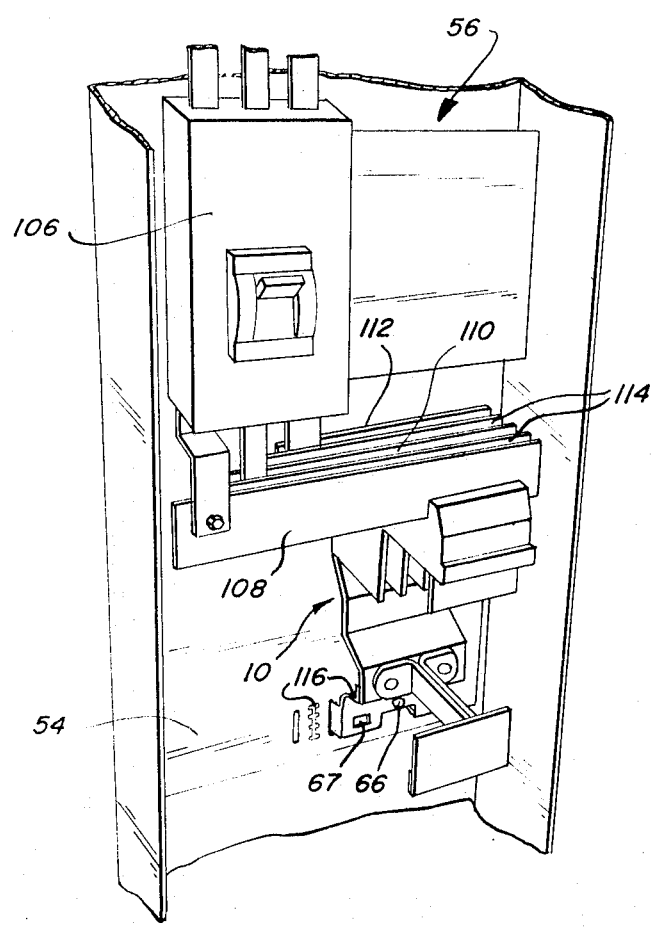
FIG. 4 is a perspective view, partially broken away, showing portions of a switchboard enclosure with the mounting device of FIG. 1 installed therein.

Referring now to FIGS. 1–3, there is shown a plug-on circuit breaker mounting device, generally designated 10, suitable for use with an electrical switchboard of the type shown in copending application, Ser. No. 298,320, filed Oct. 17, 1972, and assigned to the assignee of this application and which includes an enclosure and a stack of bus bars similar to those disclosed in Jorgensen et al, U.S. Reissue Patent No. 26,737, dated Dec. 9, 1969, which has a three-phase electrical circuit including three parallel electrical buses suitably separated by parallel members molded of insulating material.

The mounting device 10 includes a sheet metal base member 12 formed to define a rearwardly turned upper (when the mounting device 10 is installed as shown in FIG. 4) edge portion 14 and three generally parallel step portions including an upper step portion 16 adjacent upper edge portion 14, a central step portion 18 and a lower step portion 20. An insulating shroud 22 (to be discussed in greater detail below) is provided and has a rear flange 24 with a pair of apertures 26 (one aperture 26 is shown in FIG. 2) extending therethrough. Flange 24 is arranged to be secured to edge 14 of member 12 by threaded bolts 28 (FIG. 3) received into apertures 26 and threaded into apertures 30 in edge 14.

A generally rectangular sheet metal strip 32 is secured to central step portion 18 by threaded bolts 34 and is turned upwardly at 36 and return looped upon itself to present a continuous rolled-over mounting bead or bar 38 which extends substantially the entire width of member 12.

A pair of generally U-shaped brackets 40 each having a foot portion 40a secured to lower step portion 20 by ribets 42, leg portions 40b extending upwardly from step portion 20 and arm portions 40c extending outwardly generally parallel to foot portions 40a to provide a mounting surface for a rectangular trim strip 44 which is arranged to be secured to arm portions 40c by threaded screws 46. A mounting bracket, generally designated 48, is secured to the underside of lower step portion 20 (for example, by rivets 42), extends below and rearwardly of lower step portion 20 and is formed to define two bight portions 50 (FIG. 2), each extending rearwardly of the underside of lower step portion 20 and each terminating in an upwardly extending hook portion 52 which is arranged to be received in an aperture (not shown) through an interior the mounting pan 54 (see FIG. 4) in a switchboard enclosure 56.

Bracket 48 also has a generally U-shaped support arm 57, including leg portions 58 and 59, and rearwardly turned bight portions 60 and 62. A bolt-receiving aperture 64 is provided through bracket 48 adjacent leg portion 58 and is aligned with a bolt-receiving aperture (not shown) through leg portion 59. The bolt-receiving apertures through bracket 48 and leg portion 59 are arranged to be aligned with a corresponding aperture through the mounting pan 54 for reception of suitable mounting bolt 66 (FIG. 4) when the mounting device 10 has been installed in place. A rectangular aperture 67 is provided through bracket 48 and is arranged to receive the tip of a screwdriver or other appropriate tool which may be inserted into a corresponding slot through the mounting pan 54 in switchboard 56.

The shroud 22 is provided with six parallel side-by-side terminal attachment recesses 68 which are suitably separated by vertical insulating strips 70. Pairs of terminal attachment buses 72, 74 and 76 are suitably mounted in recesses 68, extend upwardly through apertures through the shroud 22 and terminate in pairs of metallic jaws 78, 80 and 82, respectively, which are separated from each other by suitable pairs of molded insulating strips 84 and 86 formed on the top 88 of the shroud 22. Outer molded insulating strips 90 and 92 are also formed on top 88 of the shroud 22. Each pair of metallic jaws 78, 80 and 82 is arranged to be connected to a single phase in a three-phase electrical circuit. A rectangular trim strip 94 is secured by suitable means within a recess 96 in the front of the shroud 22 and has an edge portion 98 extending substantially the width of the shroud 22 and projecting upwardly therefrom in front of terminal attachment recesses 68.

Referring now to FIG. 3, there is shown a circuit breaker 100 mounted in place on the mounting device 10. The circuit breaker 100 is of the type disclosed in Pat. No. 2,902,560, issued to Harris I. Stanback on Sept. 1, 1959, and has spring clips and terminals mechanically and electrically connecting it to the mounting device 10, including a pair of spring clip devices 102 and 104. Spring clip device 102 is insulated from the electric circuit and spring clip device 104 constitutes a current carrying plug-on line. Spring clip device 102 is constituted by a resilient non-current carrying spring clip supported on insulation portions of circuit breaker 100 and secured between the cover and base of the circuit breaker 100 during assembly thereof. Spring clip device 104 is constituted by a current carrying portion of circuit breaker 100 cooperating with the interior mechanism thereof and may be a conducting jaw carrying at its inner portions a stationary contact which cooperates with the movable contact of circuit breaker 100. Spring clip 104 also cooperates with portions of the insulating base of circuit breaker 100 and is supported therein and maintained in place by the insulating cover and base thereof when the circuit breaker 100 is assembled. The axes of the spring clip devices 102 and 104 are rotated 90° with respect to each other in order to facilitate the location and mounting of the electrical and mechanical supporting parts for the circuit breakers in the mounting device 10. As shown in FIG. 3, the non-conducting spring jaws 102 mechanically engage and clamp over the rolled-over mounting bead 38 provided on strip 32 secured to central step portion 18 and the current carrying spring clips 104 form contact jaws engaging their associated terminal attachment buses 72, 74 or 76.

FIG. 4 shows portions of a service section switchboard enclosure 56 having therein a main circuit breaker 106 supported on a mounting pan 54 and, extending from terminal straps on the base of main breaker 106, three parallel horizontal main electrical bus bars 108, 110 and 112 suitably supported within enclosure 56 and separated from each other by strips 114 of insulating material. The mounting pan 54 is provided with a series of ratchet slots 116 and a suitable aperture (not shown) which is positioned to be aligned with aperture 64 when a mounting device 10 has been firmly positioned in place on bus bars 108, 110 and 112. Suitable slots are provided in the mounting pan 54 and are arranged to receive hook portions 52 of bight portions 50.

When it is decided to install a plug-on circuit breaker mounting device 10, the front covers (not shown) of the switchboard are removed, jaws 78, 80 and 82 are plugged onto bus bars 108, 110 and 112, respectively, within enclosure 56 with the insulating strips 114 positioned in the recesses between pairs 84 and 86 of insulating strips on the shroud 22. A screwdriver or other tool may be inserted in aperture 67 through bight portion 60 and a ratchet slot 116. The handle of the tool may then be moved upwardly toward bus bars 108, 110 and 112 to force the pairs of plug-on jaws thereon. Several prying steps may be used with the tip of the tool engaging successive ratchet slots 116. When the mounting device 10 is in the proper position, a mounting bolt 66 may be inserted through aperture 64 and turned until the tip of bolt 66 enters both of the aligned apertures in leg portion 59 and mounting pan 54 to maintain the mounting device 10 in mounted position, with the plug-on jaws properly engaged with corresponding edge portions of the bus bars. Hook portions 52 received in the slots in mounting pan 54 prevent the pulling of mounting device 10 away from the mounting pan 54 at the end portion of the mounting device 10 adjacent bracket 48. The desired number of single pole circuit breakers may be inserted in place on mounting bead 38 and the appropriate terminal attachment buses, which are disposed perpendicular to the three-phase main bus bars, on the mounting device 10 either before or after the mounting device 10 has been installed on the mounting pan 54.

In a typical installation employing a plug-on circuit breaker mounting device constructed in accordance with the invention, a 600 volt AC, 600–800 ampere main bus is provided in the switchboard enclosure and the mounting device provides six spaces suitable for mounting six single pole circuit breakers, rated from 15 to 50 amperes each.

While a particular embodiment of the invention has been shown and described, it will be apparent to those skilled in the art that various modifications in form and detail may be made therein without departing from the spirit and scope of the appended claims.

I claim:

1. A mounting device for securing a small current capacity circuit breaker having at least one rear projecting plug-on jaw within a panelboard assembly of the type having a plurality of bus bars and having means for securing relatively larger current capacity circuit breakers with side projecting plug-on jaws in electrical contact with the bus bars, wherein the mounting device comprises
   a. a base;
   b. retaining means for mechanically retaining a small current capacity circuit breaker in removably fixed position with respect to said base; and
   c. a plurality of terminal buses secured to said base, each said terminal bus including
      1. a plug-on conductive jaw for making electrical contact with one of the panelboard bus bars, and
      2. jaw receiving means for making electrical contact with the plug-on jaw of a small current capacity circuit breaker, said jaw receiving means including an elongated conductive portion, said terminal bus plug-on jaws extending in a first plane and said elongated conductive portions extending in a second plane perpendicular to said first plane, each said elongated conductive portion being positioned with its longitudinal axis perpendicular to said first plane to make electrical and mechanical contact with the rear projecting plug-on jaw of a small current capcity circuit breaker.

2. A mounting device as defined in claim 1 wherein said base includes a sheet metal base member and an insulating shroud connected with said sheet metal base member, said insulating shroud includes a plurality of terminal bus recesses arranged side-by-side in parallel relationship, said terminal buses being disposed within said terminal bus recesses, respectively, said insulating shroud further including a plurality of insulating strips extending between said terminal bus plug-on conductive jaws.

3. A mounting device as defined in claim 2, wherein said retaining means includes a first trim strip removably mounted on said shroud.

4. A mounting device as defined in claim 3, wherein said retaining means further includes a pair of brackets mounted on said base member and a second trim strip removably mounted on said brackets.

* * * * *

PO-1050
(5/69)

UNITED STATES PATENT OFFICE
CERTIFICATE OF CORRECTION

Patent No. 3,842,322                    Dated  October 15, 1974

Inventor(s)  James H. Leonard

It is certified that error appears in the above-identified patent and that said Letters Patent are hereby corrected as shown below:

Column 1, line 1 - insert "panelboards" after --electrical--;
column 1, line 3 - cancel "panelboards".

Signed and sealed this 1st day of April 1975.

(SEAL)
Attest:

RUTH C. MASON
Attesting Officer

C. MARSHALL DANN
Commissioner of Patents
and Trademarks